(12) United States Patent
Furuhashi

(10) Patent No.: US 11,122,176 B2
(45) Date of Patent: Sep. 14, 2021

(54) NON-TRANSITORY COMPUTER-READABLE STORAGE MEDIUM

(71) Applicant: BROTHER KOGYO KABUSHIKI KAISHA, Nagoya (JP)

(72) Inventor: Michihiko Furuhashi, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/029,010

(22) Filed: Sep. 22, 2020

(65) Prior Publication Data

US 2021/0099597 A1    Apr. 1, 2021

(30) Foreign Application Priority Data

Sep. 27, 2019 (JP) .............................. JP2019-177974

(51) Int. Cl.
| | |
|---|---|
| *G06K 15/00* | (2006.01) |
| *H04N 1/40* | (2006.01) |
| *H04N 1/405* | (2006.01) |
| *H04N 1/00* | (2006.01) |
| *G06F 3/12* | (2006.01) |

(52) U.S. Cl.
CPC ....... *H04N 1/00676* (2013.01); *G06F 3/1204* (2013.01); *G06F 3/1243* (2013.01); *G06F 3/1292* (2013.01)

(58) Field of Classification Search
CPC . H04N 1/00676; G06F 3/1204; G06F 3/1243; G06F 3/1292

USPC ...................... 358/304, 1.15, 1.13, 1.14, 1.1
See application file for complete search history.

(56) References Cited

U.S. PATENT DOCUMENTS

| | | | |
|---|---|---|---|
| 2019/0364169 A1* | 11/2019 | Iida | ..................... H04N 1/32662 |
| 2020/0241822 A1* | 7/2020 | Shikama | ............... G06F 3/1292 |

FOREIGN PATENT DOCUMENTS

| | | |
|---|---|---|
| JP | 3327312 B2 | 9/2002 |
| JP | 2014-191418 A | 10/2014 |

\* cited by examiner

*Primary Examiner* — Douglas Q Tran
(74) *Attorney, Agent, or Firm* — Kenealy Vaidya LLP

(57) ABSTRACT

An operation terminal is caused to perform: acquiring cumulative operation amounts of a plurality of items of each of a plurality of printing apparatuses, the cumulative operation amounts being transmitted from the plurality of printing apparatuses which are within a communication range of the communication unit; receiving, via an operation unit, a designation of at least one item of the plurality of items; determining a use frequency ranking of the plurality of printing apparatuses in accordance with the received designation; and performing, based on a result of the determined use frequency ranking, one of connection processing of connecting to a printing apparatus by the wireless communication and preparation processing of preparing for connection to a printing apparatus by the wireless communication, in a manner that a printing apparatus having a low use frequency ranking is prioritized over a printing apparatus having a high use frequency ranking.

8 Claims, 10 Drawing Sheets

FIG. 3

| | NUMBER OF PRINTED SHEETS [SHEETS] | PRINT LENGTH [mm] | PRINTING COVERAGE [%] | NUMBER OF CUTTING TIMES [TIMES] | DEGREE OF DETERIORATION OF BATTERY |
|---|---|---|---|---|---|
| PRINTER 1 | 50 | 500 | 30 | 50 | LOW |
| PRINTER 2 | 100 | 300 | 40 | 100 | HIGH |
| PRINTER 3 | 120 | 100 | 10 | 50 | MEDIUM |

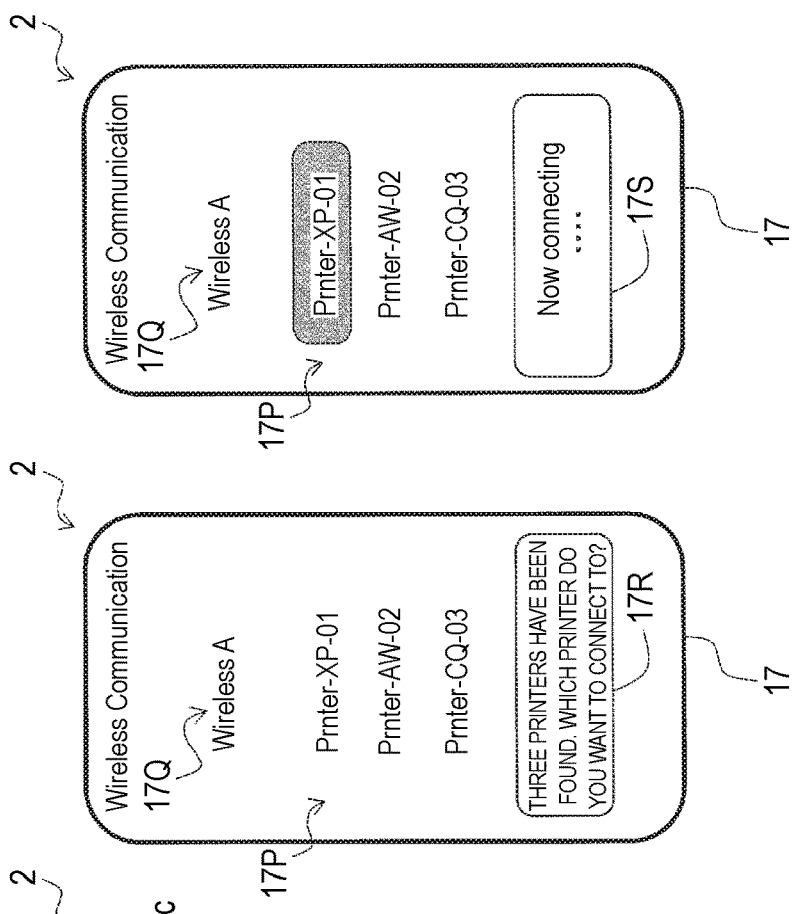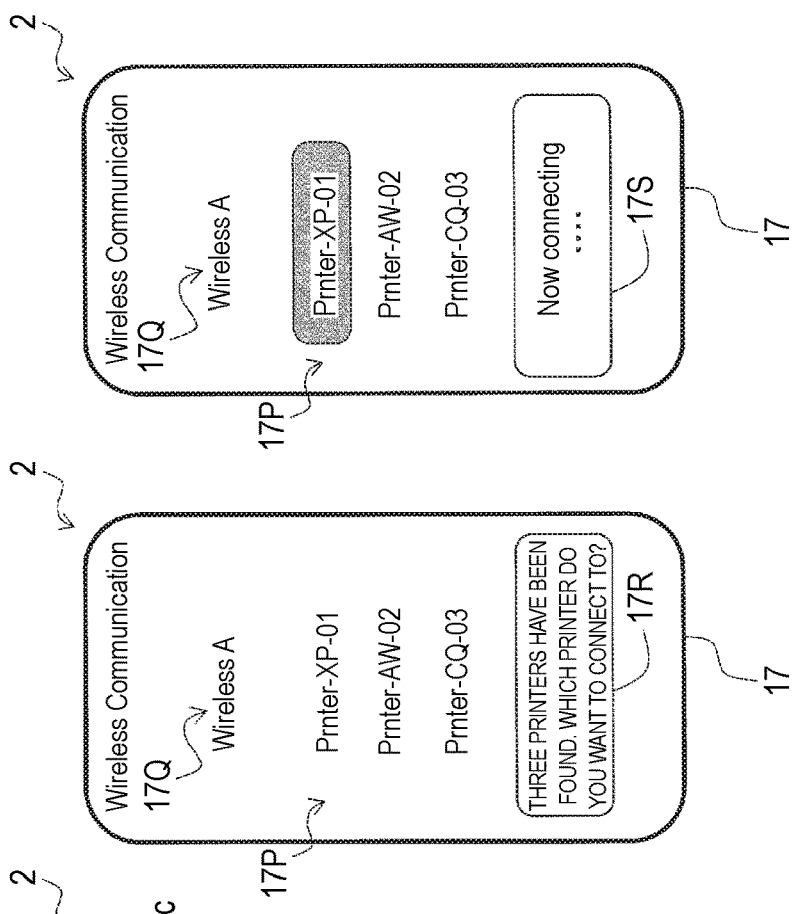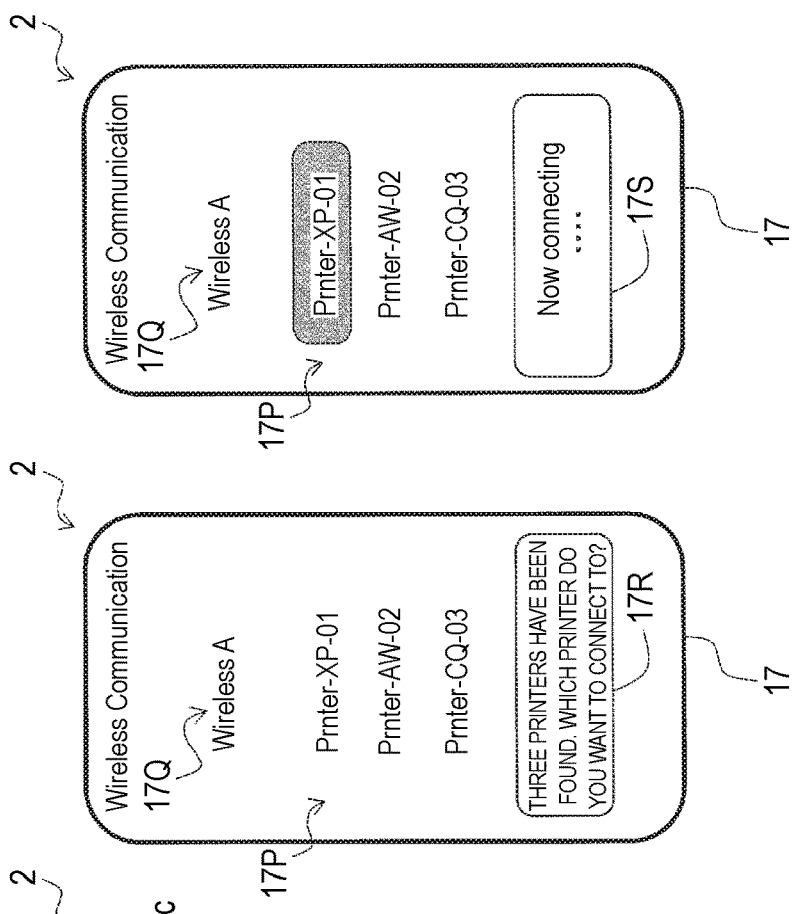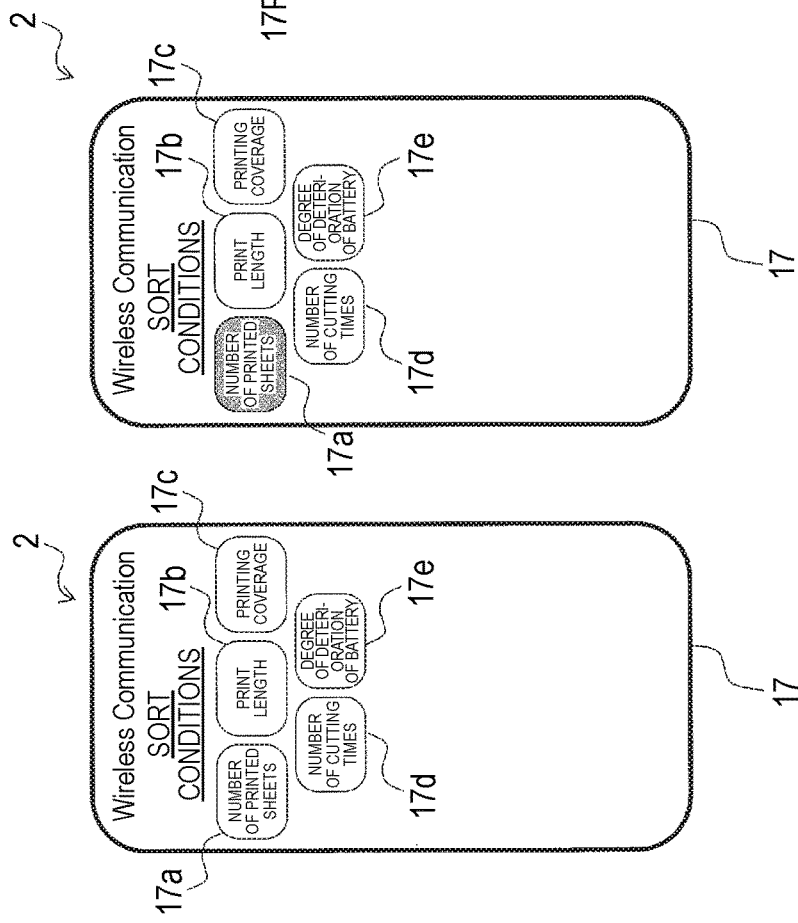

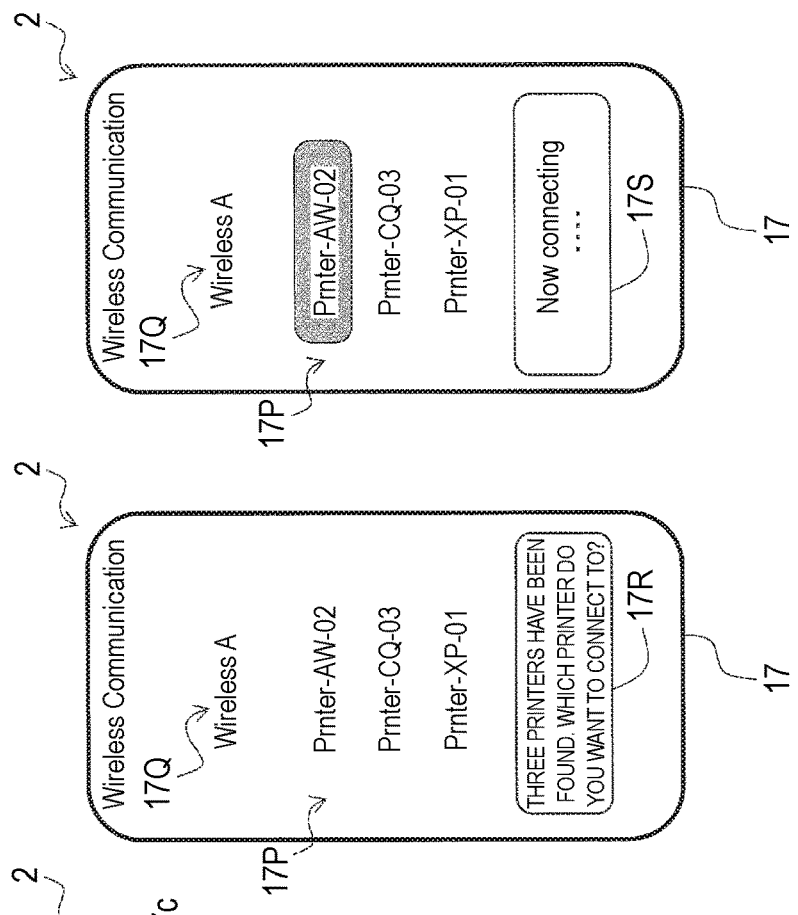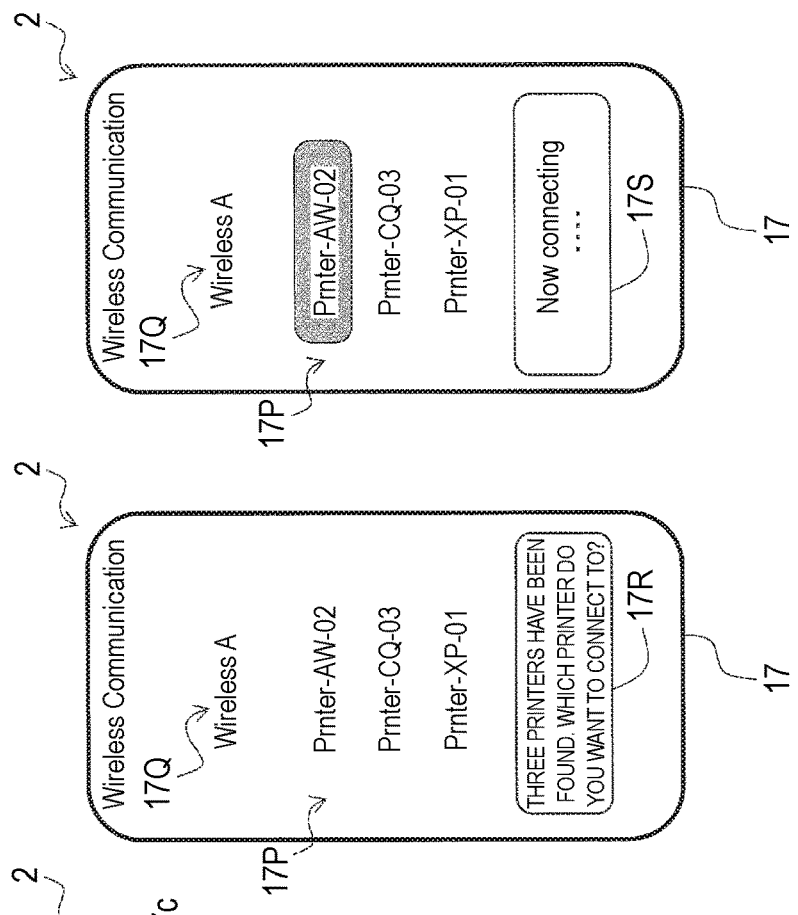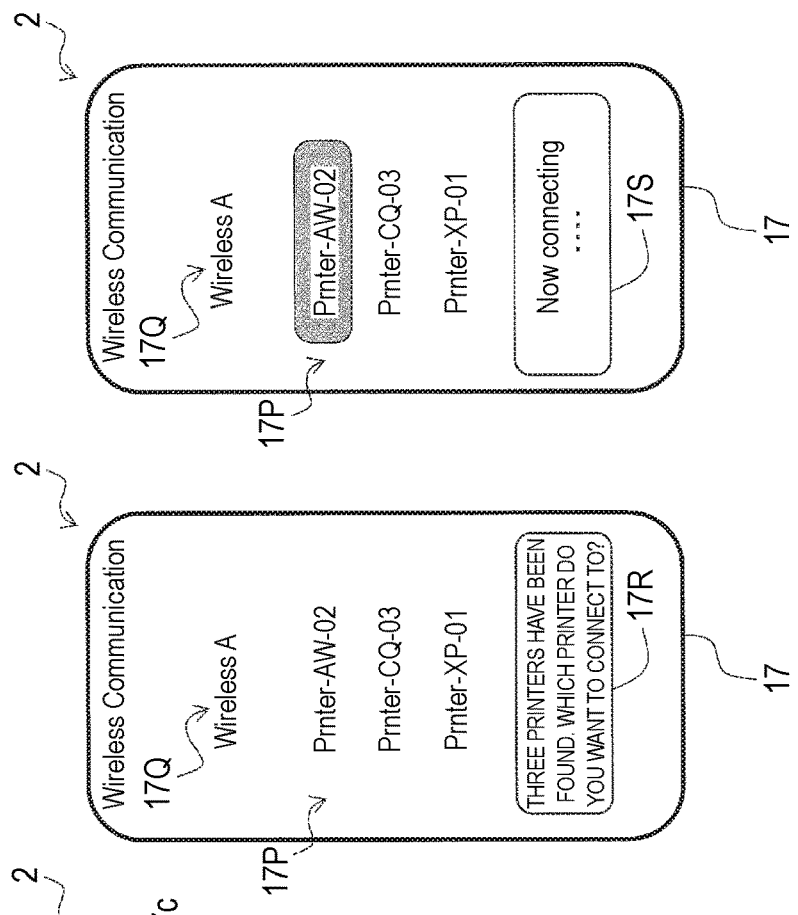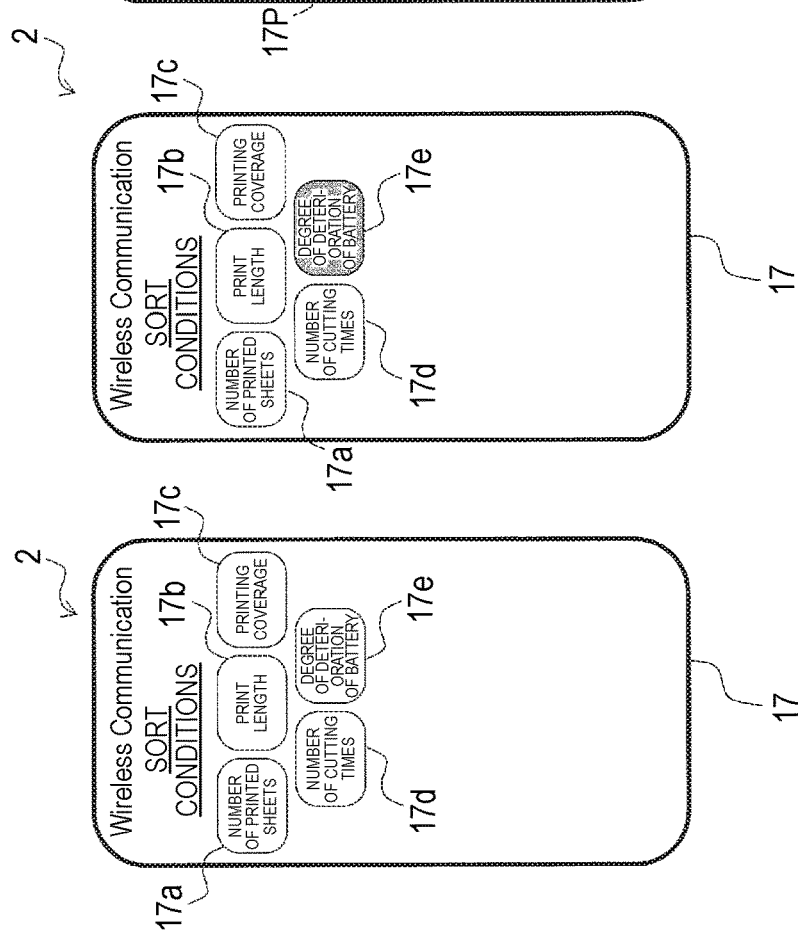

FIG. 7

| WEIGHT | 10 | 5 | 3 | 1 | 3 |
|---|---|---|---|---|---|
| | NUMBER OF PRINTED SHEETS [SHEETS] | PRINT LENGTH [mm] | PRINTING COVERAGE [%] | NUMBER OF CUTTING TIMES [TIMES] | DEGREE OF DETERIORATION OF BATTERY |
| PRINTER 1 | 50 | 500 | 30 | 50 | LOW (3) |
| PRINTER 2 | 100 | 300 | 40 | 100 | HIGH (1) |
| PRINTER 3 | 120 | 100 | 10 | 50 | MEDIUM (2) |

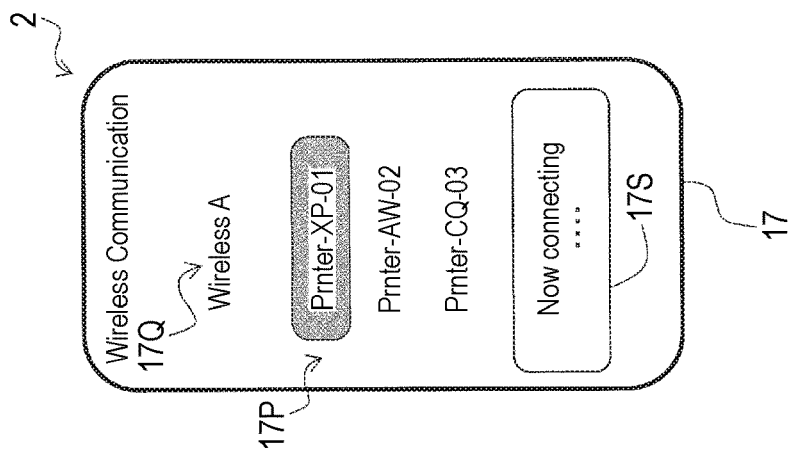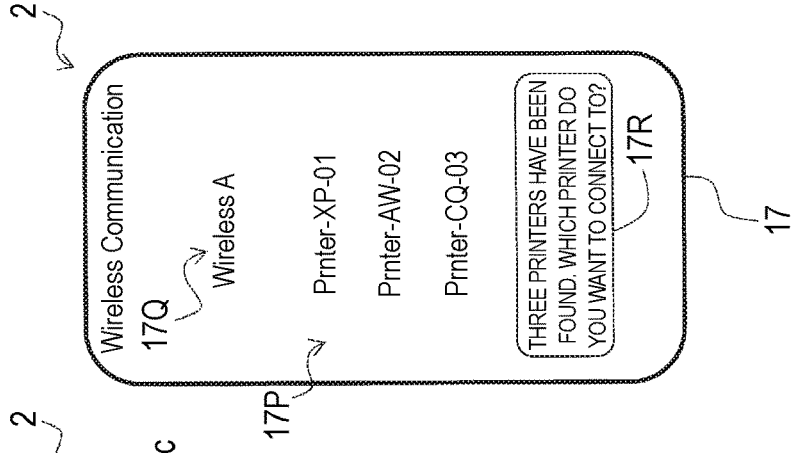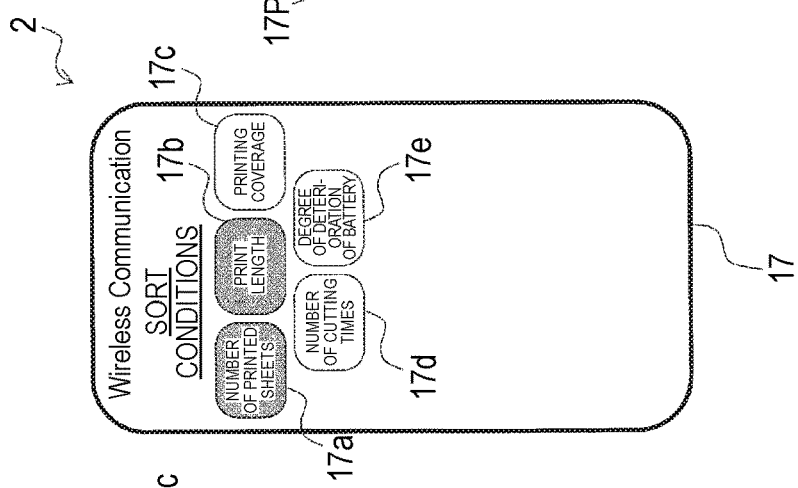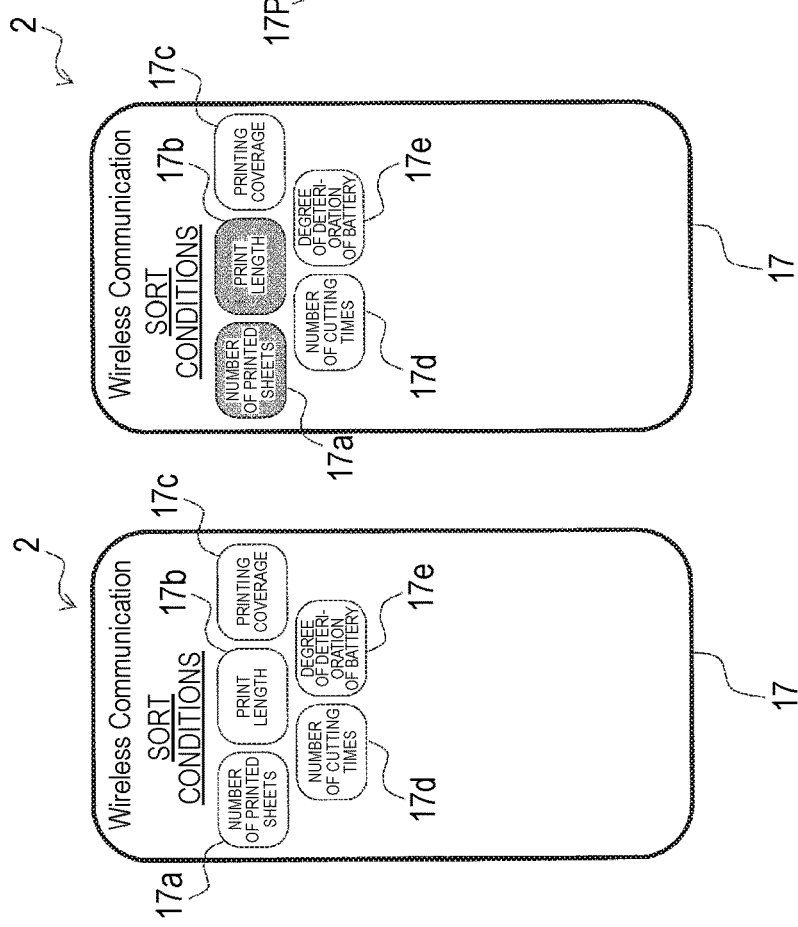

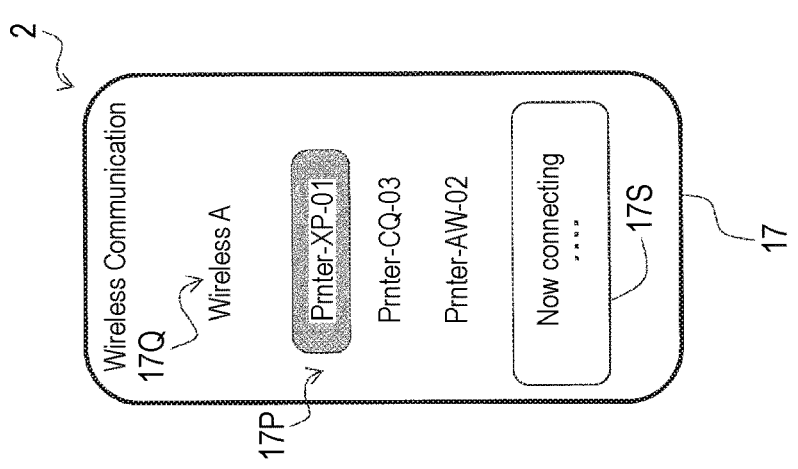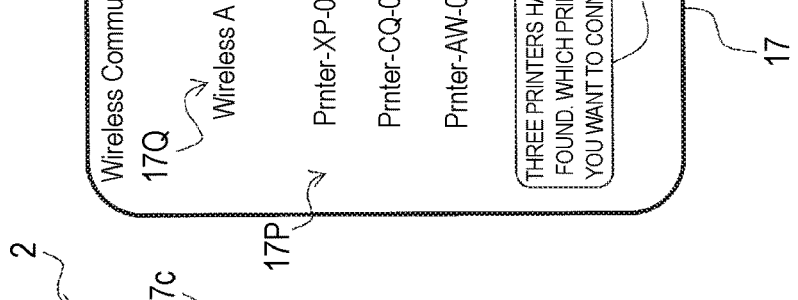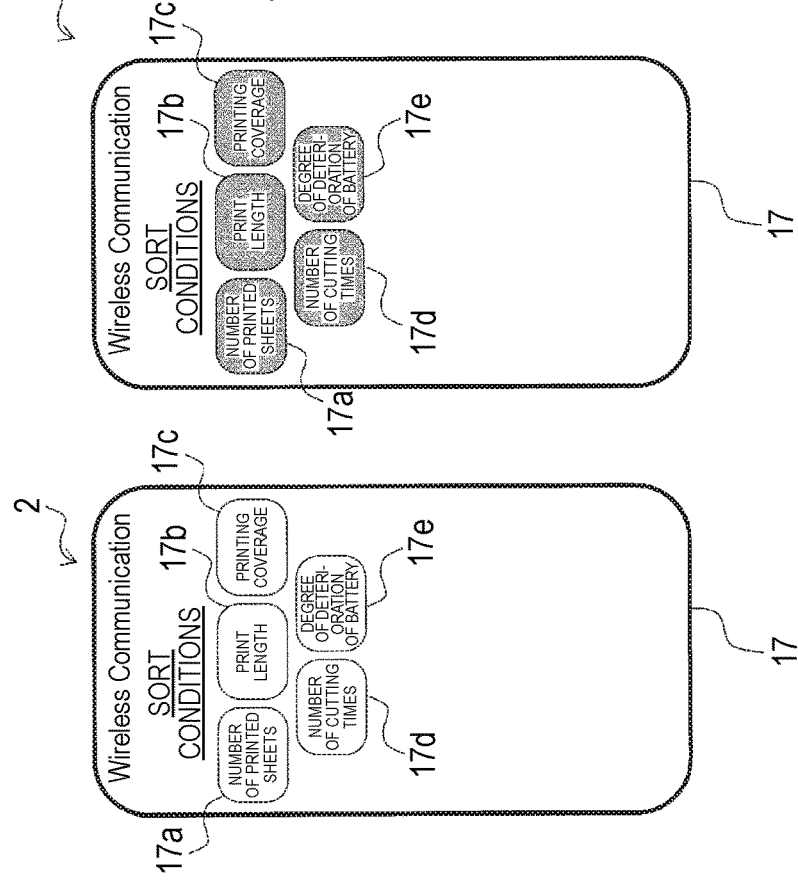

NON-TRANSITORY COMPUTER-READABLE STORAGE MEDIUM

CROSS-REFERENCE TO RELATED APPLICATIONS

This application is based upon and claims the benefit of priority from prior Japanese patent application No. 2019-177974, filed on Sep. 27, 2019, the entire contents of which are incorporated herein by reference.

TECHNICAL FIELD

The present disclosure relates to a non-transitory computer-readable storage medium storing a computer program that is executed by a computer of an operation terminal connected to a printing apparatus.

BACKGROUND ART

Known is a printing apparatus capable of performing communication with an operation terminal via wireless communication (for example, refer to JP-A-2014-191418). In the printing apparatus (printed label production apparatus) of the related art, for example, when printing data is received from an external device (operation terminal), printing corresponding to the printing data is performed on a printing medium (tape for label) being conveyed.

In the meantime, in an office and the like, for example, there may be a plurality of printing apparatuses that can be connected to one operation terminal. In an environment where the operation terminal can freely connect to any of the plurality of printing apparatuses, a situation may occur in which there is a deviation in use frequency of each printing apparatus, such as a case where while one of the plurality of printing apparatuses is frequently connected and printing is performed therein, another printing apparatus is infrequently connected and printing is rarely performed. In this case, some of the printing apparatuses that are frequently used may be rapidly deteriorated, so that a failure, a damage and the like are likely to be caused.

SUMMARY

An aspect of the present disclosure provides a non-transitory computer-readable storage medium storing a computer program that is executed by a computer of an operation terminal, the computer program, when executed by the computer, enables a plurality of printing apparatuses to be used as evenly as possible and can eliminate an uneven use frequency among the plurality of printing apparatuses.

According to an aspect of the present disclosure, there is provided a non-transitory computer-readable storage medium storing a computer program readable by a computer of an operation terminal, the operation terminal including a communication unit connected, via wireless communication, to a printing apparatus configured to perform printing on a printing medium while conveying the printing medium so that information can be transmitted to and received from the printing apparatus, a display configured to display information, an operation unit, and the computer, the computer program, when executed by the computer, causing the operation terminal to perform: acquiring cumulative operation amounts of a plurality of items of each of a plurality of the printing apparatuses, the cumulative operation amounts being amounts cumulated within a predetermined time period, and the cumulative operation amounts being transmitted from the plurality of printing apparatuses which are within a communication range of the communication unit; receiving, via the operation unit, a designation of at least one item of the plurality of items; determining a use frequency ranking of the plurality of printing apparatuses in accordance with the received designation; and performing, based on a result of the determined use frequency ranking, one of connection processing of connecting to a printing apparatus by the wireless communication and preparation processing of preparing for connection to a printing apparatus by the wireless communication, in a manner that a printing apparatus having a low use frequency ranking is prioritized over a printing apparatus having a high use frequency ranking.

BRIEF DESCRIPTION OF DRAWINGS

FIG. 3 is a table showing an example of values of cumulative operation amounts of each label printer;

FIGS. 4A to 4D illustrate an example of screen transition of the operation terminal;

FIGS. 5A to 5D illustrate another example of the screen transition of the operation terminal:

FIG. 7 is a table showing an example of values of cumulative operation amounts of each label printer together with corresponding weighting values, in a modified embodiment of selecting the cumulative operation amounts of the plurality of items on a touch panel:

FIGS. 8A to 8D illustrate an example of the screen transition of the operation terminal;

FIGS. 9A to 9D illustrate another example of the screen transition of the operation terminal.

DESCRIPTION OF EMBODIMENTS

Hereinbelow, embodiments of the present disclosure will be described with reference to the drawings.

Present Embodiment

An embodiment of the present disclosure is described with reference to FIGS. 1 to 6.

<Configuration of Printing Processing System>

First, an entire configuration of a printing processing system of the present embodiment is described with reference to FIG. 1.

Figure 1:
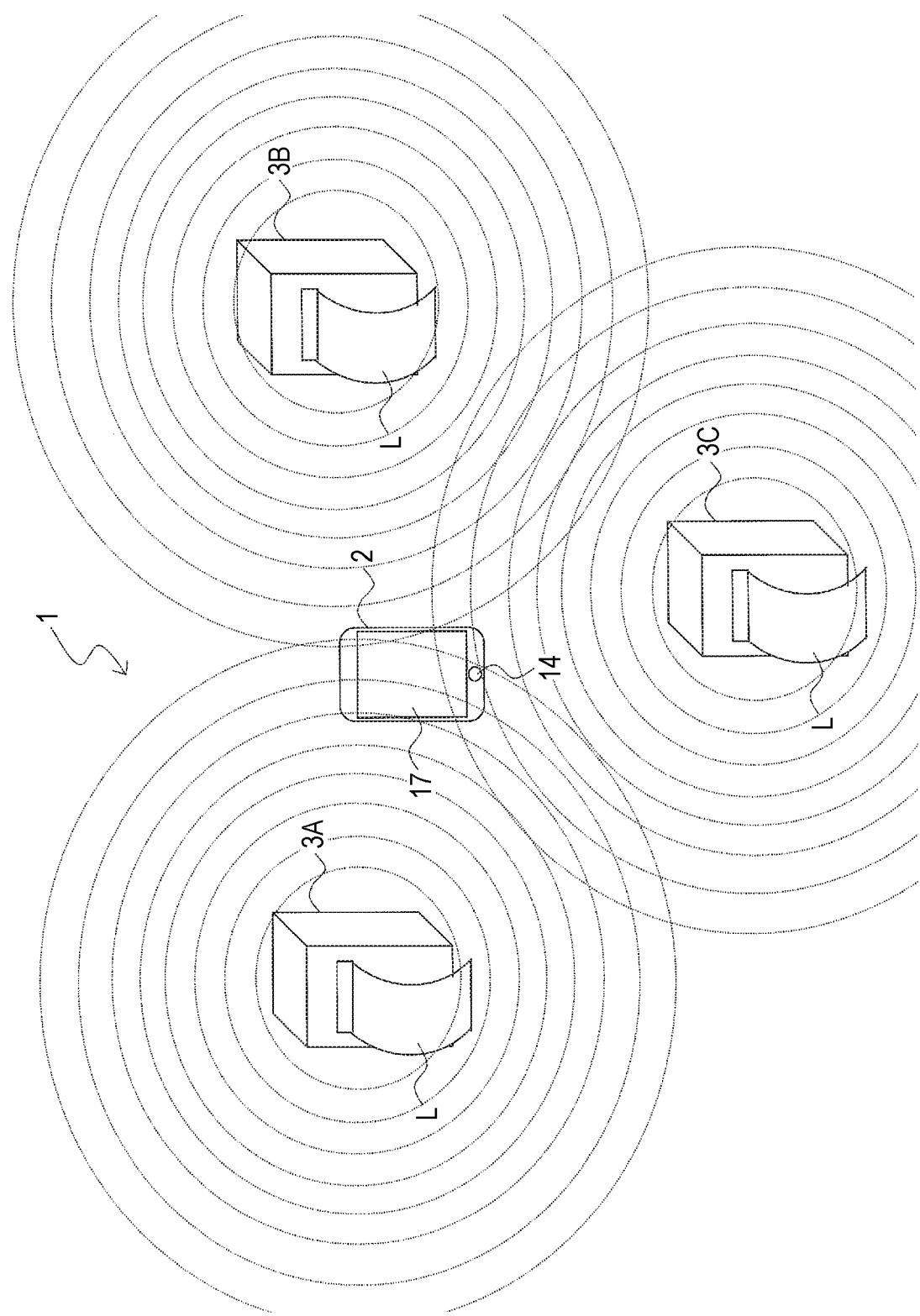
FIG. 1 is a system configuration view depicting an entire configuration of a printing processing system in accordance with an embodiment of the present disclosure.

As shown in FIG. 1, a printing processing system 1 of the present embodiment includes an operation terminal 2, and at least one (three, in the present example) label printer 3A, 3B and 3C. The label printers 3A, 3B and 3C can connect to the operation terminal 2 via Bluetooth (registered trademark) wireless communication (hereinbelow, simply referred to as "Bluetooth communication"). In other words, the label printers 3A, 3B and 3C are within a communication range by Bluetooth communication from the operation terminal 2. As a result, data can be transmitted and received between each of the label printers 3A, 3B and 3C and the operation terminal 2. In the meantime, when collectively referring to "label printers 3A, 3B and 3C" without distinguishing the same, they are simply referred to as "label printer 3". In the meantime, the label printer 3 corresponds to an example of the printing apparatus.

The operation terminal 2 is a so-called smartphone having an operation button 14 and a touch panel 17 that is a display having a display function and enabling a touch operation. In the meantime, the operation terminal 2 is not limited to the smartphone and may be a so-called feature phone, a tablet-type computer, a laptop computer, a desktop computer or the like, and the display is not limited to the touch panel 17.

The label printer 3 is configured to transmit and receive a variety of information and instruction signals to and from the operation terminal 2, and to produce a printed label L having a desired print such as a text and an image thereon, based on a user operation on the operation terminal 2. In the meantime, the printed label L corresponds to an example of the printing medium printed.

<Functional Configuration>

Subsequently, a functional configuration of the printing processing system is described with reference to FIG. 2.

<Operation Terminal>

Figure 2:
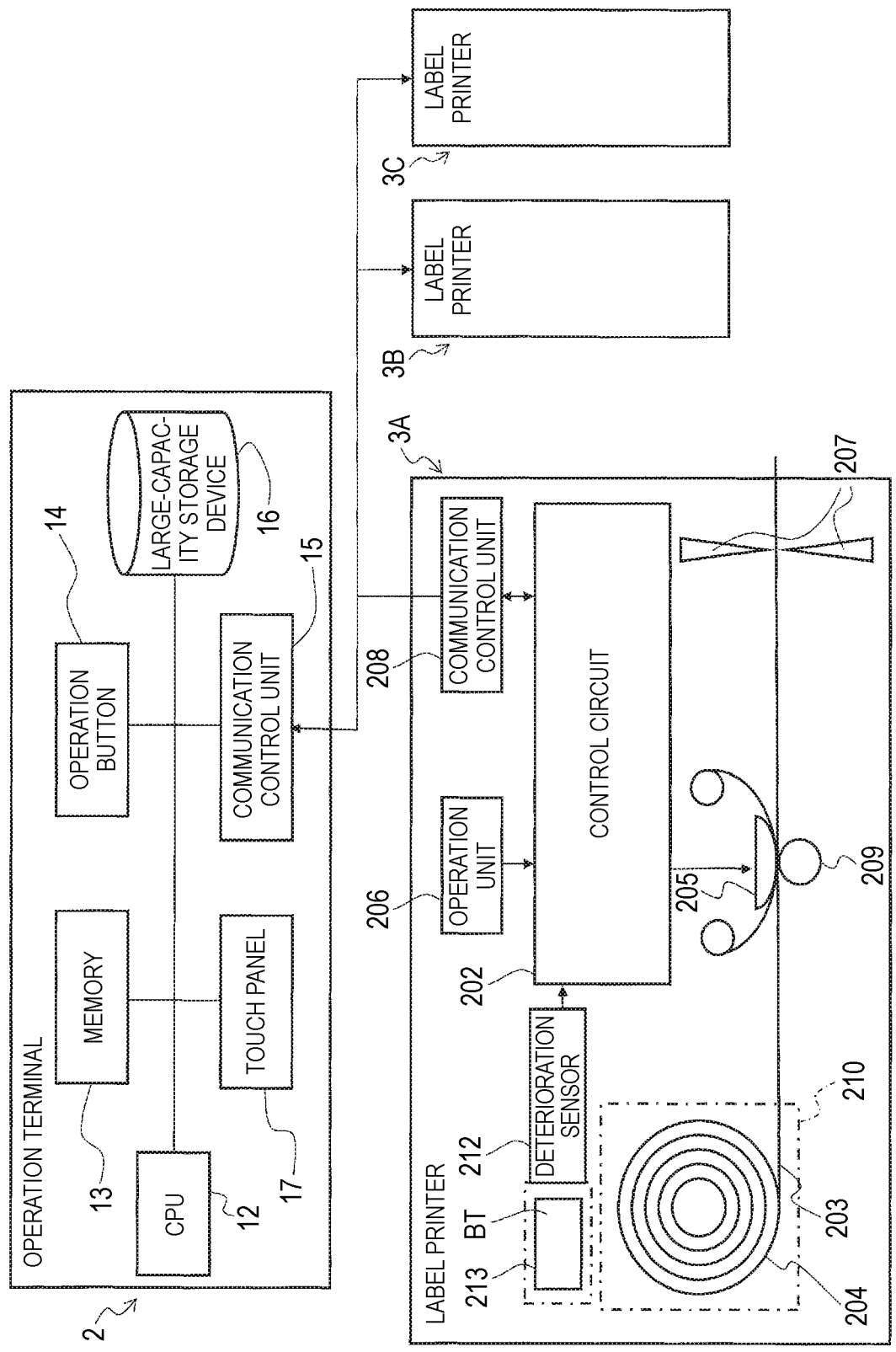
FIG. 2 is a functional block diagram depicting a functional configuration of an operation terminal and a label printer.

As shown in FIG. 2, the operation terminal 2 includes a CPU 12, a memory 13 including a RAM, a ROM and the like, the operation button 14, a communication control unit 15, a large-capacity storage device 16 such as a flash memory, and the touch panel 17. In the meantime, a display function part of the touch panel 17 corresponds to an example of the display defined in the claims, the communication control unit 15 corresponds to an example of the communication unit, and the CPU 12 corresponds to an example of the computer. Also, an operation function part of the touch panel 17 and the operation button 14 correspond to an example of the operation unit defined in the claims. Hereinbelow, they are collectively referred to as "the operation unit 14 and the like".

In the RAM of the memory 13, for example, printing data corresponding to a desired print content to be written on the printed label L, which is produced as a result of the user's appropriate operation on the touch panel 17, is stored.

The CPU 12 is configured to control the operation terminal 2 as a whole by executing a variety of programs stored in the ROM of the memory 13 and the large-capacity storage device 16 while using a temporary storing function of the RAM of the memory 13. In the meantime, the programs include an information processing program of the present embodiment configured to execute processing shown in flowcharts of FIGS. 6 and 10 to be described later.

The communication control unit 15 is configured to control communication that is performed with the label printer 3.

The large-capacity storage device 16 is, for example, a main body memory but is not limited thereto, and may be an appropriate external memory such as an SD memory card.

In the above configuration, the operation terminal 2 can connect to any one of the plurality of label printers 3 (the label printers 3A to 3C, in the present example) within the communication range via the communication control unit 15. When performing printing, for example, the operation terminal 2 is connected to one appropriate label printer 3 via wireless communication by a well-known method, and the operation unit 14 and the like are operated to transmit a printing instruction to the connected label printer 3, so that it is possible to cause the label printer 3 to perform desired printing.

<Label Printer>

The label printer 3 includes a control circuit 202, an operation unit 206, a communication control unit 208, a cartridge holder 210, an accommodation unit 213 in which a battery BT configured to apply an electromotive force is accommodated, a deterioration sensor 212 configured to detect a degree of deterioration of the battery BT accommodated in the accommodation unit 213, a print head 205, a cutter 207, and a conveyor device 209. In the meantime, the accommodation unit 213 corresponds to an example of the accommodation part defined in the claims, and the cutter 207 corresponds to an example of the cutter.

The control circuit 202 includes a CPU, a RAM, a ROM and the like. In the ROM, a processing program configured to cause the CPU of the control circuit 202 to execute predetermined processing is stored.

The communication control unit 208 is configured to control communication that is performed with the communication control unit 15 of the operation terminal 2.

The cartridge holder 210 can be detachably mounted with a cartridge having a tape roll 204 (which actually has a spiral shape but is simplified and shown as concentric circles) having a tape 203 wound thereon (or the cartridge holder may also be configured as a roll holder to which the tape roll 204 can be directly detachably mounted). In the meantime, the tape 203 corresponds to an example of the—printing medium defined in the claims.

The conveyor device 209 is provided facing the print head 205, and is configured to convey the tape 203 that is reeled out from the tape roll 204.

The print head 205 is configured to perform, on the tape 203 conveyed by the conveyor device 209, printing based on printing data received from the operation terminal 2.

The cutter 207 is configured to drive by a drive solenoid (not shown) under control of the control circuit 202 and to cut the printed tape 203 into a predetermined length to form a printed label L (refer to FIG. 1). In the meantime, the control circuit 202 is configured to count a history when the cutter 207 performs a cutting operation, and to store the number of cutting times in an appropriate memory (for example, the ROM or the like).

The deterioration sensor 212 is configured to detect a degree of deterioration of the battery BT by a well-known method, and to output the corresponding deterioration information to the control circuit 202.

Feature of Embodiment

As described above, in an environment where the operation terminal 2 can freely connect to any of the plurality of label printers 3, a situation may occur in which there is a deviation in use frequency of each label printer 3, such as a case where while one of the plurality of label printers 3 is frequently connected and printing is performed therein, another printing label printer 3 is infrequently connected and printing is rarely performed. In this case, some of the label printers 3 that are frequently used may be rapidly deteriorated, so that a failure, a damage and the like are likely to be caused.

Therefore, in order to avoid the situation, in the present embodiment, the CPU of each of the label printers 3 (in the present example, the label printers 3A, 3B and 3C) collects regularly cumulative operation amounts of a plurality of its own items (which will be described later) within a predetermined time period, and broadcasts the same to the operation terminal 2 by the Bluetooth communication. The cumulative operation amounts include, for example, the number of the produced printed labels L, a print length printed on the printed label L, a printing coverage, the number of cutting times of the tape 203 by the cutter 207, a degree of deterioration of the battery BT and the like, when each of the label printers 3 has repeatedly performed an operation of producing a printed label L.

In the operation terminal 2, after acquiring the cumulative operation amounts of the plurality of items broadcasted from each of the label printers 3 as described above, a use frequency ranking of each of the label printers 3 is determined with respect to at least one item that a user intends. A name of the label printer 3 of which the use frequency ranking is lower is displayed at an upper part of the touch panel 17. Thereby, the label printer 3 that is less frequently used is more likely to be connected by the user (for transmitting the printing data), so that each of the label printers 3 can be used more evenly. In the below, the details are sequentially described.

<Example of Cumulative Operation Amounts of Each Printer>

For example, FIG. 3 shows an example of the cumulative operation amounts of the label printers 3A to 3C within an appropriate predetermined time period (for example, a time period from any past timing at which the label printer 3 was purchased to a current point of time). In the example, as the cumulative operation amounts, five operation amounts, which are the number of productions of the printed label L[sheets], the print length[mm]printed on the printed label L, the printing coverage[%], the number of cutting times of the tape 203[times] and the degree of deterioration of the battery BT, are counted by the CPU of each of the label printers 3. In the meantime, in FIG. 3, the label printer 3A is simply shown as "Printer 1", the label printer 3B is simply shown as "Printer 2", and the label printer 3C is simply shown as "Printer 3". Also, the number of the produced printed labels L is simply shown as "number of printed sheets".

In FIG. 3, for the label printer 3A, the number of productions of the printed label L is 50[sheets], the print length is 500 [mm], the printing coverage is 30[%], the number of cutting times is 50[times], and the degree of deterioration of the battery BT is set as a relative value "Low". Similarly, for the label printer 3B, the number of productions of the printed label L is 100[sheets], the print length is 300 [mm], the printing coverage is 40[%], the number of cutting times is 100[times], and the degree of deterioration of the battery BT is set as a relative value "High". Similarly, for the label printer 3C, the number of productions of the printed label L is 120[sheets], the print length is 100 [mm], the printing coverage is 10[%], the number of cutting times is 50[times], and the degree of deterioration of the battery BT is set as a relative value "Medium".

From each of the label printers 3A to 3C, cumulative operation amount information including the respective values of the cumulative operation amounts is broadcasted at predetermined intervals. As a result, the cumulative operation amount information of the label printers 3A, 3B and 3C is received via the communication control unit 15, and is acquired regularly by the operation terminal 2.

<Display Screen of Operation Terminal>

In the operation terminal 2, when the cumulative operation amount information from the label printers 3A, 3B and 3C is acquired as described above, selection buttons for selecting the cumulative operation amounts of the corresponding items are displayed on the touch panel 17, as shown in FIG. 4A, for example. In this example, as the number of productions of the printed label L[sheets], the printing coverage[%], the print length[mm] printed on the printed label L, the number of cutting times[times] of the tape 203 and the degree of deterioration of the battery BT are respectively received, five selection buttons of a "number of printed sheets" button 17a, a "print length" button 17b, a "printing coverage" button 17c, a "number of cutting times" button 17d, and a "degree of deterioration of battery" button 17e are displayed on the touch panel 17.

<Example of Cumulative Operation Amount Designation>

FIG. 4B shows a case where the user presses the "number of printed sheets" button 17a of the selection buttons 17a to 17e to designate the "number of productions of the printed label L" of the cumulative operation amounts. Thereby, the operation terminal 2 determines a use frequency ranking based on the selected number of productions of the printed label L for each of the label printers 3A, 3B and 3C. As shown in FIG. 3, the number of productions of the printed label L in the label printer 3A is 50[sheets], the number of productions of the printed label L in the label printer 3B is 100[sheets], and the number of productions of the printed label L in the label printer 3C is 120[sheets]. Therefore, with respect to the use frequency ranking, the label printer 3C is ranked first, the label printer 3B is ranked second, and the label printer 3A is ranked third in descending order of the number of productions.

In the operation terminal 2, identification information (a model number/a name and the like) of each of the label printers 3 is displayed on a screen of the touch panel 17 such that the label printer 3 having a low use frequency ranking is displayed in preference to the label printer 3 having a high use frequency ranking, in accordance with the determined ranking. In the present example, the label printer 3 having a low use frequency ranking is displayed on an uppermost part of the touch panel 17. That is, as shown in FIG. 4C, in a use frequency display column 17P of the screen of the touch panel 17, the identification information "Printer-XP-01" indicative of the label printer 3A having the lowest ranking is displayed at the uppermost end, the identification information "Printer-AW-02" indicative of the label printer 3B is displayed below the identification information "Printer-XP-01", and the identification information "Printer-CQ-03" indicative of the label printer 3C is displayed at the lowest end.

In correspondence to the display of the three label printers 3A to 3C, a message 17R "Three printers have been found. Which printer do you want to connect to?" is displayed below the use frequency display column 17P. In the meantime, identification information "Wireless A" of wireless communication corresponding to a communication display column 17Q indicative of wireless communication being used is displayed above the use frequency display column 17P.

FIG. 4D shows a case where the user who sees the screen display on the touch panel 17 of FIG. 4C selects "Printer-XP-01" displayed at the uppermost end. Thereby, for the label printer 3A, connection for transmission of printing data is performed (refer to a connection-in-progress display column 17S indicating that connection is in progress).

<Another Example of Cumulative Operation Amount Designation>

FIGS. 5A to 5D shows an example where another cumulative operation amount is designated. That is, FIG. 5B shows a case where the user presses the "degree of deterioration of the battery" button 17e to designate the "degree of deterioration of the battery BT" of the cumulative operation amounts in a state of FIG. 5A where the five selection buttons of the "number of printed sheets" button 17a, the "print length" button 17b, the "printing coverage" button 17c, the "number of cutting times" button 17d, and the "degree of deterioration of the battery" button 17e are displayed, similarly to FIG. 4A.

In this case, the operation terminal 2 determines the use frequency ranking based on the selected degree of deterioration of the battery BT for each of the label printers 3A, 3B and 3C. As shown in FIG. 3, the degree of deterioration in the label printer 3A is "Low", the degree of deterioration in the label printer 3B is "High", and the degree of deterioration in the label printer 3C is "Medium" Therefore, with respect to the use frequency ranking, the label printer 3A is ranked first, the label printer 3C is ranked second, and the label printer 3B is ranked third in order of the lower degree of deterioration.

In the operation terminal 2, the identification information (a model number/a name and the like) of each of the label printers 3 is displayed on the screen of the touch panel 17 such that the label printer 3 having a low use frequency ranking is displayed in preference to the label printer 3 having a high use frequency ranking, in accordance with the determined ranking. In the present example, the label printer 3 having a low use frequency ranking is displayed on an uppermost part of the touch panel 17. That is, as shown in FIG. 5C, in the use frequency display column 17P of the screen of the touch panel 17, the identification information "Printer-AW-02" indicative of the label printer 3B having the lowest ranking is displayed at the uppermost end, the identification information "Printer-CQ-03" indicative of the label printer 3C is displayed below the identification information "Printer-AQ-02", and the identification information "Printer-XP-01" indicative of the label printer 3A is displayed at the lowest end.

In correspondence to the display of the three label printers 3A to 3C, the message 17R "Three printers have been found. Which printer do you want to connect to?" is displayed below the use frequency display column 17P, similarly to the above case.

FIG. 5D shows a case where the user who sees the screen display on the touch panel 17 of FIG. 5C selects "Printer-AW-02" displayed at the uppermost end. Thereby, for the label printer 3B, connection for transmission of the printing data is performed (refer to the connection-in-progress display column 17S indicating that connection is in progress).

<Control Procedure of Operation Terminal>

Processing that is executed by the CPU 12 of the operation terminal 2 so as to implement the above configuration is described with reference to a flowchart shown in FIG. 6. Here, the information processing program is executed, so that the processing shown in the flow is performed (which also applies to FIG. 10).

Figure 6:
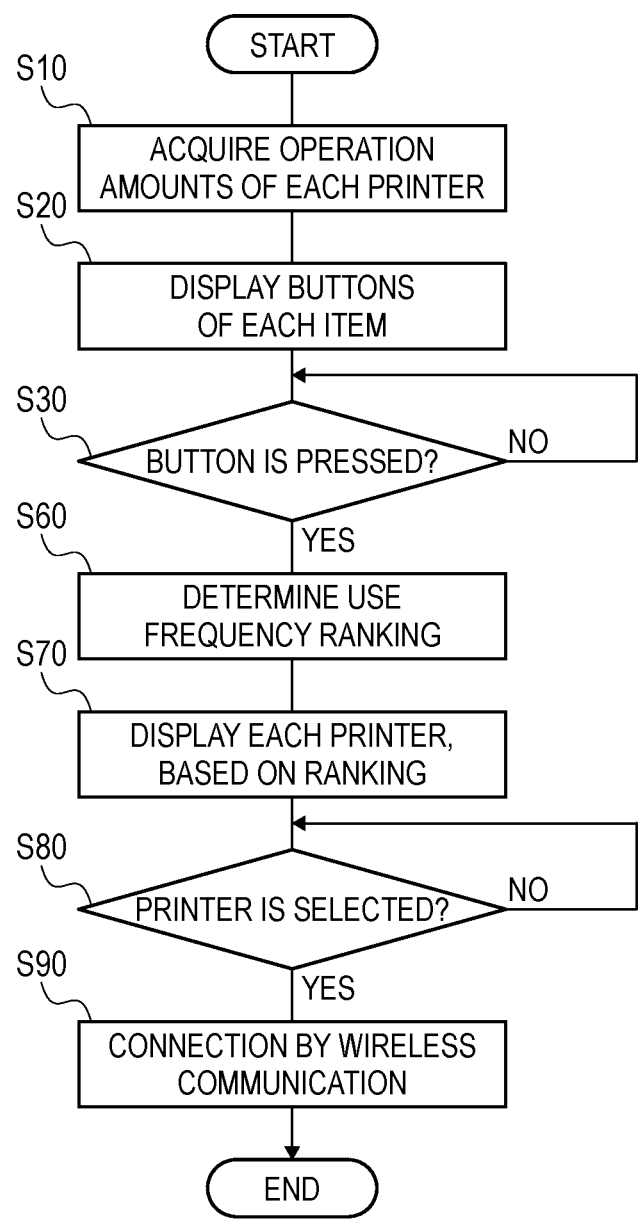
FIG. 6 is a flowchart depicting a processing procedure that is executed by a CPU of the operation terminal.

In FIG. 6, in step S10, the CPU 12 receives the cumulative operation amount information of each of the label printers 3, which is broadcasted from the label printers 3A to 3C as described above, via the communication control unit 15, and acquires the corresponding cumulative operation amounts. Step S10 corresponds to the acquiring of the cumulative operation amounts defined in the claims.

Then, in step S20, the CPU 12 displays the selection buttons (in the above example, the "number of printed sheets" button 17a, the "print length" button 17b, the "printing coverage" button 17c, the "number of cutting times" button 17d, and the "degree of deterioration of the battery" button 17e, which is the same as below) for selecting the items corresponding to the cumulative operation amounts acquired in step S10 so as to be selectable on the touch panel 17. Step S20 corresponds to the displaying of the selection buttons defined in the claims.

Then, in step S30, the CPU 12 determines whether at least one of the selection buttons 17a to 17e (hereinbelow, simply collectively referred to as "the selection button 17a and the like") displayed in step S20 is pressed. When any of the selection button 17a and the like is not pressed, the determination is not satisfied (S30: NO), and the CPU 12 loop waits. When at least one of the selection button 17a and the like is pressed to designate an item of the corresponding cumulative operation amount, the determination in step S30 is satisfied (S30: YES), and the CPU 12 proceeds to step S60. Step S30 corresponds to the receiving of the designation defined in the claims.

In step S60, the CPU 12 determines the use frequency ranking with reference to the value of the cumulative operation amount of the item selected in step S30 of the cumulative operation amounts of each of the label printers 3 acquired in step S10. As described above, when the selected item is, for example, the number of productions of the printed label L, the ranking is determined as the first, second and the like, in descending order of the number of productions. In the meantime, when the selected item is the print length, the printing coverage or the number of cutting times, the rankings are determined as the first, second and the like, in order of the larger values, similarly. Also, when the selected item is, for example, the degree of deterioration of the battery T, the ranking is determined as the first, second and the like, in order of the relatively lower degree of deterioration.

Then, in step S70, the CPU 12 displays the label printers 3 on the touch panel 7 such that the label printer 3 having a low use frequency ranking is displayed in preference to the label printer 3 having a high use frequency ranking, in accordance with the use frequency rankings of each of the label printers 3 determined in step S60. In the meantime, step S70 and step S90 (which will be described later) correspond to the performing one of connection processing and preparation processing defined in the claims and the processing that is executed in step S70 corresponds to the preparation processing as defined in the claims.

Then, in step S80, the CPU 12 determines whether which of the label printers 3 is selected by the user, in correspondence to the display on the touch panel 17 in step S70. When none of the label printers are selected, the determination is not satisfied (S80: NO), and the CPU 12 loop waits. When any one of the label printers 3 is selected, the determination is satisfied (S80: YES), and the CPU 12 proceeds to step S90.

In step S90, the CPU 12 is connected to the communication control unit 208 of the label printer 3 selected in step S80 by the communication control unit 15 so that the information can be transmitted and received by a well-known method. Thereby, as described above, after the connection is completed, when the user operates appropriately the operation unit 14 and the like, a printing instruction (including the printing data) can be transmitted to the connected label printer 3. The processing that is executed in step S90 corresponds to the connection processing defined in the claims. After the processing in step S90 is completed, the flow is over.

Effects of Embodiment

As described above, in the present embodiment, based on the values of the cumulative operation amounts acquired from each of the label printers 3, the use frequency ranking of the label printers 3 are determined, and the label printers are displayed on the touch panel 17 such that the label printer 3 having a low use frequency ranking is displayed in preference to the label printer 3 having a high use frequency ranking. Thereby, when the user operates the label printer 3 via the operation terminal 2 for printing, the operation terminal 2 can be more easily connected to the label printer 3 having a low use frequency ranking than to the label printer 3 having a high use frequency ranking among the plurality of label printers 3 within the communication range. Thereby, the plurality of label printers 3 is used substantially evenly, so that it is possible to eliminate a deviation in use frequency among the plurality of label printers 3. As a result, it is possible to suppress rapid deterioration, failure, damage and the like of some of the label printers 3, as described above, so that it is possible to improve convenience for the user.

Also, in the present embodiment, particularly, the selection buttons 17a to 17e for selecting the cumulative operation amounts of the respective items are displayed on the touch panel 17, and the designation of the corresponding item is received by the user's selection operation on the selection buttons 17a to 17e. Thereby, when determining the use frequency ranking, for example, it is possible to adjust which item of the cumulative operation amounts of the plurality of items is taken into consideration, which item is not taken into consideration, and the like, as desired by the user.

In the above, when the use frequency ranking of each of the label printers 3 is determined in step S60, the identification information of each of the label printers 3 is displayed in step S70, based on the rankings, and then the connection to one label printer 3 is performed in step S90, in accordance with the user's selection. However, the present disclosure is not limited thereto. For example, step S70 and step S80 may be omitted. That is, in this case, when the use frequency ranking of each of the label printers 3 is determined in step S60, the connection to each of the label printers 3 may be performed such that the label printer 3 having a low use frequency ranking is connected in preference to the label printer 3 having a high use frequency ranking, based on the determined rankings, in step S90. In the above example, when the item selected by the user is, for example, the number of productions of the printed label L, the connection is performed for the label printer 3A having the lowest use frequency ranking (without performing the display and the selection). In the meantime, when the connection is impossible or a connection condition is poor even though the connection to the label printer 3A is performed, the connection is performed for the label printer 3B having the next lowest use frequency ranking. When the connection is impossible or a connection condition is poor with respect to the label printer 3B, the connection is performed for the label printer 3C having the next lowest use frequency. In this case, step S90 corresponds to performing one of connection processing and preparation processing defined in the claims, and the processing that is executed in step S90 corresponds to the connection processing.

In this case, even when the user is not particularly conscious, the operation terminal 2 is connected to the label printer 3 having a low use frequency ranking, in preference to the label printer 3 having a high use frequency ranking. Also in this case, similarly to the above, it is possible to eliminate the deviation in use frequency among the plurality of label printers 3.

Modified Embodiments

In the meantime, the present disclosure is not limited to the above embodiment, and a variety of changes can be made without departing from the spirit and technical ides of the present disclosure. Hereinbelow, modified embodiments are sequentially described. The parts equivalent to the embodiment are denoted with the same reference signs, and the descriptions thereof are appropriately omitted or simplified.

(1) Case where Cumulative Operation Amounts of Plurality of Items are Selected on Touch Panel That is, the present modified embodiment relates to a case where the user selects two or more of the cumulative operation amounts of the plurality of items (in other words, the selection buttons 17a to 17e) displayed on the touch panel 17 as described above. In this case, the use frequency rankings are determined by a sum of scores corresponding to the values of the cumulative operation amounts of the respective items. When calculating the total score, a predetermined weighting (which will be described in detail later) is performed for the value of the cumulative operation amount of each item, and the total scores after the weightings are compared to each other, so that the use frequency rankings of the plurality of label printers 3 are determined. In the meantime, the total score corresponds to an example of the score defined in the claims.

<Example of Weighting>

In the present modified embodiment, an example of the cumulative operation amounts of each of the label printers 3 and the weighting to each item of the cumulative operation amounts is described with reference to FIG. 7 corresponding to FIG. 3. In the example of FIG. 7, similarly to FIG. 3, the number of productions of the printed label L in the label printer 3A is 50[sheets], the print length is 500 [mm], the printing coverage is 30[%], the number of cutting times is 50[times], and the degree of deterioration of the battery BT is a relative value "Low". Similarly, the number of productions of the printed label L in the label printer 3B is 100[sheets], the print length is 300 [mm], the printing coverage is 40[%], the number of cutting times is 100 [times], and the degree of deterioration of the battery BT is a relative value "High". Similarly, the number of productions of the printed label L in the label printer 3C is 120[sheets], the print length is 100 [mm], the printing coverage is 10[%], the number of cutting times is 50[times], and the degree of deterioration of the battery BT is a relative value "Medium".

As shown in the uppermost end of FIG. 7, a predetermined weight is set and given in advance to the cumulative operation amount of each item. In the shown example, a weight "10" is given to the number of productions of the printed label L, a weight "5" is given to the print length, a weight "3" is given to the printing coverage, a weight "1" is given to the number of cutting times, and a weight "3" is given to the degree of deterioration of the battery BT. When the cumulative operation amounts of the plurality of items are selected by the user, as described above, the values of the selected cumulative operation amounts of the plurality of items are multiplied by the weights, respectively, and the identification information of the label printer 3 to be displayed in preference is determined based on a magnitude of the total score obtained by summing the multiplied values.

In the calculation of the total score of the present example, the value of the cumulative operation amount of each item of the label printer 3A of the three label printers 3A, 3B and 3C is set to a reference value (100/100), the reference value is multiplied by the value of the weight given to each item, and values after the multiplication are summed for the selected plurality of items. In the meantime, for the values of the cumulative operation amounts of each item of the remaining label printers 3B and 3C, a relative value conversion with respect to the reference value of the label printer 3A is performed, the relative value is multiplied by the value of the weight given to each item, and values after the multiplication are summed.

In the meantime, as described above, the degree of deterioration of the battery BT is evaluated as "High", "Medium" and "Low", in the present example. However, in calculations below, "High" is replaced with a numerical value of 1, "Medium" is replaced with a numerical value of 2 and "Low" is replaced with a numerical value of 3 (refer to the numbers in parentheses in FIG. 7).

Example 1 of Score Calculation

As an example, a case is described in which after the five selection buttons 17a to 17e similar to FIG. 4A are displayed on the touch panel 17, as shown in FIG. 8A, the "number of printed sheets" button 17a and the "print length" button 17b are pressed by the user (the two cumulative operation amounts of the number of printed sheets and the print length are selected), as shown in FIG. 8B.

In this case, the value of the cumulative operation amount of each item of the label printer 3A is that the number of productions of the printed label L is 50[sheets] and the print length is 500 [mm]. In the meantime, since a total score of the label printer 3A is a sum of values obtained by multiplying a relative value with a value of the cumulative operation amount as the reference value by the weight for each cumulative operation amount (the weight "10" for the number of productions of the printed label L and the weight "5" for the print length), the total score is 10+5=15[points].

In the meantime, since the number of productions of the printed label L of the label printer 3B is 100[sheets] (which is twice the label printer 3A) and the print length is 300 [mm](which is ⅗ times of the label printer 3A), a total score of the label printer 3B is 10×2+5×(⅗)=20+3=23[points].

Similarly, since the number of productions of the printed label L of the label printer 3C is 120[sheets] (which is ¹²⁄₅ times of the label printer 3A) and the print length is 100 [mm] (which is ⅕ times of the label printer 3A), a total score of the label printer 3C is 10×(¹²⁄₅)+5×(⅕)=24+1=25[points].

As a result, the total score is in the order of the label printer 3A<the label printer 3B<the label printer 3C. Therefore, with respect to the use frequency ranking, the label printer 3A is ranked first, the label printer 3B is ranked second, and the label printer 3C is ranked third, in ascending order of the total score.

As a result, similarly to FIG. 4C, the identification information (a model number, a name and the like) of each of the label printers 3 is displayed (at a further upper part of the touch panel 17, in the present example) in such that the label printer 3 having the low use frequency ranking is displayed in preference to the label printer 3 having the high use frequency ranking. That is, as shown in FIG. 8C, in the use frequency display column 17P, the identification information "Printer-XP-01" indicative of the label printer 3A having the lowest ranking is displayed at the uppermost end, the identification information "Printer-AW-02" indicative of the label printer 3B is displayed below the identification information "Printer-XP-01", and the identification information "Printer-CQ-03" indicative of the label printer 3C is displayed at the lowest end.

FIG. 8D depicts a case where the user who sees the screen display on the touch panel 17 of FIG. 8C selects "Printer-XP-01" displayed at the uppermost end in a similar manner to the above. Similarly to the above, the connection-in-progress display column 17S indicating that connection to the selected label printer 3A is in progress is shown.

Example 2 of Score Calculation

As another example, a case is described in which after the five selection buttons 17a to 17e similar to FIGS. 4A and 8A are displayed on the touch panel 17, as shown in FIG. 9A, the five the selection buttons of the "number of printed sheets" button 17a, the "print length" button 17b, the "printing coverage" button 17c, the "number of cutting times" button 17d and the "degree of deterioration of the battery" button 17e are all pressed by the user (the five cumulative operation amounts of the number of printed sheets, the print length, the printing coverage, the number of cutting times and the degree of deterioration of the battery are selected), as shown in FIG. 9B.

In this case, since the weight "10" is given to the number of productions of the printed label L, the weight "5" is given to the print length, the weight "3" is given to the printing coverage, the weight "1" is given to the number of cutting times and the weight "3" is given to the degree of deterioration of the battery BT, a total score of the label printer 3A is 10+5+3+1+3=22[points].

In the meantime, since the number of productions of the printed label L of the label printer 3B is 100[sheets] (which is twice the label printer 3A), the print length is 300 [mm](which is ⅗ times of the label printer 3A), the printing coverage is 40[%] (which is ⅘ of the label printer 3A), the number of cutting times is 100[times] (which is twice the label printer 3A) and the degree of deterioration of the battery is 1 (which is ⅓ of the label printer 3A), a total score of the label printer 3B is 10×2+5×(⅗)+3×(⅘)+1×2+3−(⅓) =20+3+4+2+1=30[points].

Similarly, since the number of productions of the printed label L of the label printer 3C is 120[sheets] (which is ¹²⁄₅ times of the label printer 3A), the print length is 100 [mm](which is ⅕ times of the label printer 3A), the printing coverage is 10[%] (which is ⅓ of the label printer 3A), the number of cutting times is 50[times] (which is the same as the label printer 3A) and the degree of deterioration of the battery is 2 (which is ⅔ of the label printer 3A), a total score of the label printer 3C is 10×(¹²⁄₅)+5×(⅕)+3×(⅓)+1+3×(⅔) =24+1+1+1+2=29[points].

As a result, the total score is in the order of the label printer 3A<the label printer 3C<the label printer 3B. Therefore, with respect to the use frequency ranking, the label printer 3A is ranked first, the label printer 3C is ranked second, and the label printer 3B is ranked third, in ascending order of the total score.

As a result, similarly to FIGS. 4C and 8C, the identification information (a model number/a name and the like) of each of the label printers 3 is displayed (at a further upper part of the touch panel 17, in the present example) such that the label printer 3 having the low use frequency ranking is displayed in preference to the label printer 3 having the high use frequency ranking. That is, as shown in FIG. 9C, in the use frequency display column 17P, the identification information "Printer-XP-01" indicative of the label printer 3A having the lowest ranking is displayed at the uppermost end, the identification information "Printer-CQ-03" indicative of the label printer 3C is displayed below the identification information "Printer-XP-01", and the identification information "Printer-AW-02" indicative of the label printer 3B is displayed at the lowest end.

FIG. 9D depicts a case where the user who sees the screen display on the touch panel 17 of FIG. 9C selects "Printer-XP-01" displayed at the uppermost end in a similar manner to the above. Similarly to the above, the connection-in-progress display column 17S indicating that connection to the selected label printer 3A is in progress is shown.

<Control Procedure of Operation Terminal>

Figure 10:
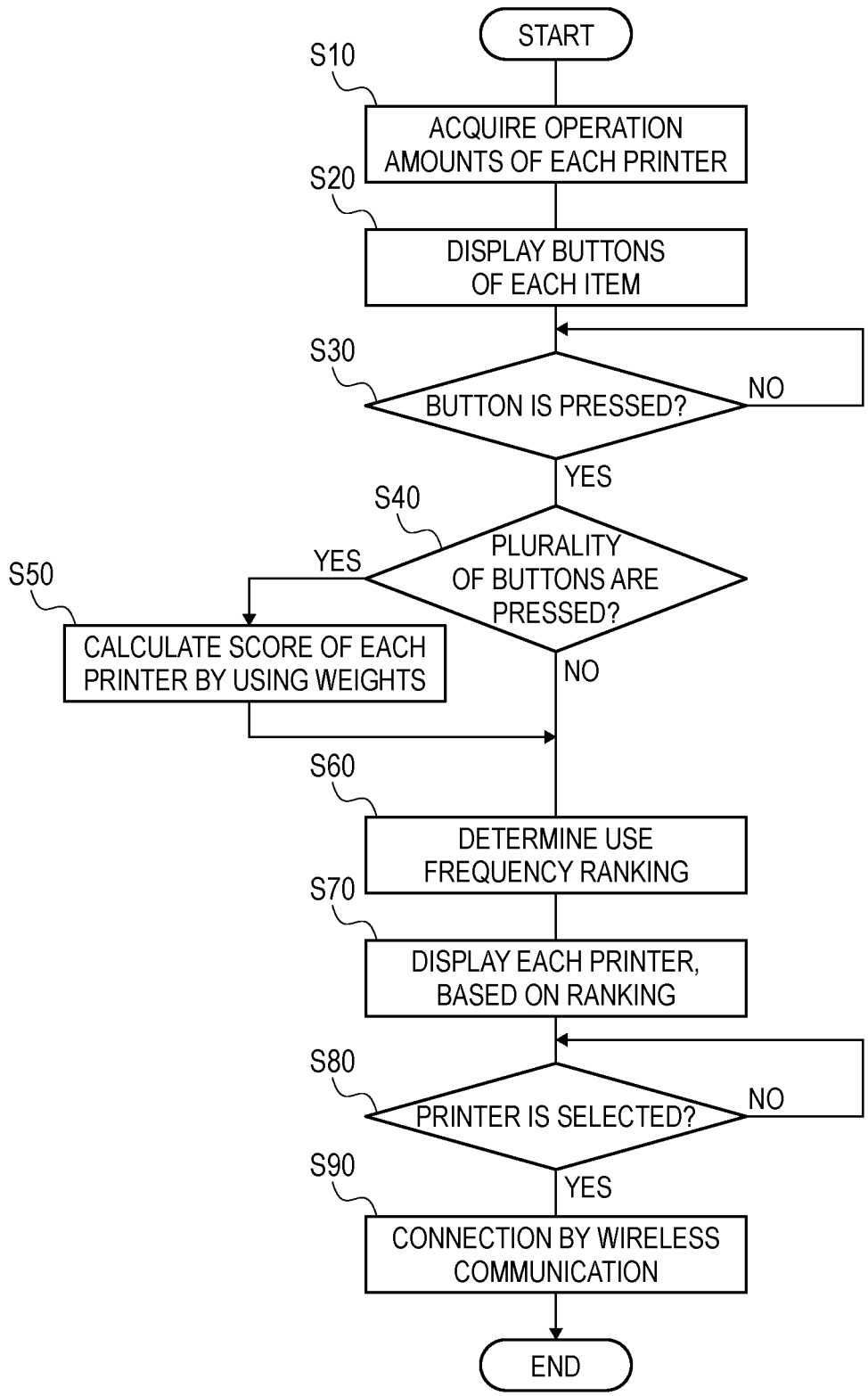
FIG. 10 is a flowchart depicting a processing procedure that is executed by the CPU of the operation terminal.

Processing that is executed by the CPU 12 of the operation terminal 2 so as to implement the above method of the present modified embodiment is shown in FIG. 10 corresponding to FIG. 6.

In the flow of FIG. 10, step S40 and step S50 are newly provided between step S30 and step S60 of FIG. 6. That is, when any of the selection buttons 17a to 17e is pressed and a determination of step S30 is satisfied (S30: YES) via step S10 to step S20 similar to the above, the CPU 12 proceeds step S40 that is newly provided.

In step S40, the CPU 12 determines whether the selection button pressed in step S30 is two or more (in the above example, whether at least two buttons of the "number of printed sheets" button 17a, the "printing coverage" button 17c, the "print length" button 17b, the "number of cutting times" button 17d and the "degree of deterioration of the battery" button 17e are pressed). When the pressed selection button is only one, the determination is not satisfied (S40: NO), and the CPU 12 proceeds to step S60 similar to FIG. 6. Then, step S60 to step S90 similar to FIG. 6 are executed, and the flow is over.

In the meantime, in step S40, when the pressed selection button is only one, the determination is not satisfied (S40: NO), and when the pressed selection button is two or more, the determination is satisfied (S40: YES) and the CPU 12 proceeds to step S50.

In step S50, the CPU 12 calculates the total score of each of the label printers 3 by the above-described method of using the weights associated with each of the plurality of cumulative operation amounts corresponding to the selected plurality of selection buttons. In the meantime, step S50 corresponds to the calculating of the score defined in the claims.

Then, in step S60, the CPU 12 determines the use frequency ranking by the above described method, based on the total scores of each of the label printers 3 calculated in step S50. The contents of processing of step S70 to step S90 are similar to the above embodiment, and the descriptions thereof are omitted.

Effects of Modified Embodiment

As described above, in the present modified embodiment, when the cumulative operation amounts of the plurality of items are selected by the user, the total score of each of the label printers 3 is calculated by giving the predetermined weighting to each of the cumulative operation amounts and summing the same. Then, the use frequency ranking of each of the plurality of label printers 3 is determined, based on the total score. Thereby, when determining the use frequency ranking, the weight of each item such as a particularly important item (for example, the "number of printed sheets") of the cumulative operation amounts of the plurality of items, an item that is not so important (for example, the "number of cutting times") and the like can be digitized and set. When determining the use frequency ranking of each of the label printers 3, the total score in which the weights are reflected is calculated for each of the label printers 3, so that it is possible to determine the use frequency rankings smoothly and accurately by the magnitudes of the total scores.

(2) Others

In the above, the cases where the present disclosure is applied to, as the printing apparatus, the label printer 3 configured to produce the printed label L by performing a desired printing on the tape 203 as the printing medium have been exemplified. However, the present disclosure is not limited thereto. That is, the present disclosure can also be applied to a printer configured to form an image or to print characters on a normal sheet (corresponding to an example of the printing medium) of A4, A3, B4, B5 or the like or a portable printer configured to drive by a battery power supply, as an example of the printing apparatus. That is, the present disclosure can be applied to any printing apparatus having a communication function with the operation terminal 2 via the wireless communication. Similar effects are also obtained in these cases.

Also, in the above, the examples where the present disclosure is applied to a smartphone, a feature phone, a tablet-type computer, a laptop computer, a desktop computer or the like, as the operation terminal 2 have been described. However, the present disclosure is not limited thereto. That is, the present disclosure can also be applied to a digital camera, a measuring device, a watch, and a variety of electronic devices such as an information device, a communication device and a control device inasmuch as it has a communication function with the label printer 3 via the wireless communication. Similar effects are also obtained in these cases.

Also, in the above, the arrows shown in the respective drawings of FIG. 2 and the like indicate an example of the flow of signals and do not limit the flow direction of the signals.

Also, the flowcharts shown in FIGS. 6 and 10 do not limit the present disclosure to the procedures shown in the flows, and the procedures can be changed or a procedure can be added/omitted without departing from the spirit and technical idea of the invention.

Also, the methods described in the above embodiment and respective modified embodiments can be appropriately combined and used, in addition to the above.

In addition, although not exemplified in detail, the present disclosure can be implemented with diverse modifications without departing from the spirit thereof.

What is claimed is:

1. A non-transitory computer-readable storage medium storing a computer program readable by a computer of an operation terminal, the operation terminal including a communication unit connected, via wireless communication, to a printing apparatus configured to perform printing on a printing medium while conveying the printing medium so that information can be transmitted to and received from the printing apparatus, a display configured to display information, an operation unit, and the computer, the computer program, when executed by the computer, causing the operation terminal to perform:

acquiring cumulative operation amounts of a plurality of items of each of a plurality of the printing apparatuses, the cumulative operation amounts being amounts cumulated within a predetermined time period, and the cumulative operation amounts being transmitted from the plurality of printing apparatuses which are within a communication range of the communication unit;

receiving, via the operation unit, a designation of at least one item of the plurality of items;

determining a use frequency ranking of the plurality of printing apparatuses in accordance with the received designation; and performing, based on a result of the determined use frequency ranking, one of connection processing of connecting to a printing apparatus by the wireless communication and preparation processing of preparing for connection to a printing apparatus by the wireless communication, in a manner that a printing apparatus having a low use frequency ranking is prioritized over a printing apparatus having a high use frequency ranking.

2. The non-transitory computer-readable storage medium according to claim 1, wherein the preparation processing includes displaying, on the display, the printing apparatus having the low use frequency ranking in preference to the printing apparatus having the high use frequency ranking.

3. The non-transitory computer-readable storage medium according to claim 1, wherein the connection processing includes connecting, by the wireless communication via the communication unit, to the printing apparatus having the low use frequency ranking in preference to the printing apparatus having the high use frequency ranking.

4. The non-transitory computer-readable storage medium according to claim 1, wherein the computer program, when executed by the computer, causes the operation terminal to further perform:

displaying, in an operable manner, selection buttons for selecting the plurality of items on the display, and wherein the receiving of the designation includes receiving the designation of the item in response to operation of the selection button which is displayed on the display and corresponds to the item.

5. The non-transitory computer-readable storage medium according to claim 1, wherein the computer program, when executed by the computer, causes the operation terminal to further perform:

in a case where the receiving of the designation includes receiving a designation of at least two of the plurality of items, calculating a score of each of the plurality of printing apparatuses by weighting the cumulative operation amounts of the at least two received items in a predetermined manner and summing the weighted cumulative operation amounts, and wherein the determining of the use frequency ranking includes determining the use frequency ranking of each of the plurality of printing apparatuses based on the calculated scores.

6. The non-transitory computer-readable storage medium according to claim 1, wherein the cumulative operation amounts of the plurality of items include at least one of a number of the printing medium printed, a printing coverage, and a print length in each of the plurality of printing apparatuses.

7. The non-transitory computer-readable storage medium according to claim 1, wherein each of the plurality of printing apparatuses includes a cutter configured to cut the printing medium after printing, and wherein the cumulative operation amounts of the plurality of items include a number of cutting times by the cutter in each of the plurality of printing apparatuses.

8. The non-transitory computer-readable storage medium according to claim 1 wherein each of the plurality of printing apparatuses includes an accommodation part configured to accommodate a battery configured to generate an electromotive force, and wherein the cumulative operation amounts of the plurality of items include a degree of deterioration of the battery accommodated in the accommodation part in each of the plurality of printing apparatuses.

* * * * *